(12) United States Patent
Chadzelek et al.

(10) Patent No.: US 7,712,051 B2
(45) Date of Patent: May 4, 2010

(54) KEYBOARD NAVIGATION IN HIERARCHICAL USER INTERFACES

(75) Inventors: Thomas Chadzelek, Quierschied (DE); Armin Reichert, Eppelborn (DE); Josef Dietl, Nussloch (DE)

(73) Assignee: SAP AG, Walldorf (DE)

( * ) Notice: Subject to any disclaimer, the term of this patent is extended or adjusted under 35 U.S.C. 154(b) by 1014 days.

(21) Appl. No.: 10/676,811

(22) Filed: Sep. 30, 2003

(65) Prior Publication Data

US 2005/0071785 A1 Mar. 31, 2005

(51) Int. Cl.
*G06F 3/048* (2006.01)
*G06F 3/01* (2006.01)

(52) U.S. Cl. .................. 715/854; 715/767; 715/802; 715/810; 715/816; 715/829

(58) Field of Classification Search ................. 715/854, 715/863, 766–767, 773, 802, 810, 816, 828–829; 345/169; 455/550.1, 575.1
See application file for complete search history.

(56) References Cited

U.S. PATENT DOCUMENTS

| | | | |
|---|---|---|---|
| 5,295,243 A * | 3/1994 | Robertson et al. ........... 715/848 |
| 5,491,795 A * | 2/1996 | Beaudet et al. ............. 715/804 |
| 5,544,299 A | 8/1996 | Wenstrand et al. |
| 5,835,088 A | 11/1998 | Jaaskelainen, Jr. |
| 5,886,694 A * | 3/1999 | Breinberg et al. ........... 715/788 |
| 5,892,511 A | 4/1999 | Gelsinger et al. |
| 5,896,133 A * | 4/1999 | Lynch et al. ................ 715/784 |
| 6,002,862 A | 12/1999 | Takaike |
| 6,057,835 A | 5/2000 | Sato et al. |
| 6,169,984 B1 * | 1/2001 | Bogdan ......................... 707/3 |
| 6,249,284 B1 | 6/2001 | Bogdan |
| 6,297,824 B1 * | 10/2001 | Hearst et al. ................ 715/848 |
| 6,317,144 B1 | 11/2001 | Pabla et al. |
| 6,366,920 B1 | 4/2002 | Hoose et al. |
| 7,206,599 B2 * | 4/2007 | Lemley .................... 455/550.1 |
| 2004/0160464 A1 * | 8/2004 | Reyna ........................ 345/854 |
| 2004/0243616 A1 | 12/2004 | Benhase et al. |

(Continued)

OTHER PUBLICATIONS

Microsoft Excel 2002 (9.0.6926 SP-3) 1985-1999 Microsoft Corporation; Figure 2.*

(Continued)

*Primary Examiner*—Ba Huynh
*Assistant Examiner*—Nicholas Augustine
(74) *Attorney, Agent, or Firm*—Finnegan, Henderson, Farabow, Garrett & Dunner LLP

(57) ABSTRACT

Methods and apparatus, including computer program products, for navigating user interface elements of a computer program application. In one aspect, a method includes grouping user interface elements of an application into groups based on a hierarchical arrangement of the elements, detecting a navigation key press of a sibling or a parent navigation key, and if it is a sibling navigation key, shifting input focus to a next sibling group in the hierarchy, and if it is a parent navigation key, shifting input focus to a parent group in the hierarchy. In another aspect, a method for navigating editable cells of a table includes detecting a forward or a backward navigation key; if it is a forward navigation key, shifting input focus to a next editable cell of the table; and if it is a backward navigation key, shifting input focus to a previous editable cell of the table.

9 Claims, 4 Drawing Sheets

U.S. PATENT DOCUMENTS

2005/0188329 A1    8/2005    Cutler et al.

OTHER PUBLICATIONS

Microsoft Windows XP Operating System Oct. 25, 2001; Figure 3.*
David A. Karp et al, Windows XP In A Nutshell, Apr. 2002, O'Reilly First Edition, pp. 558-559.*
Delphi3000.com, "Working with objects in the Windows' namespace", (http://www.delphi3000.com/articles/article_1667.asp?SK=), Dec. 3, 2000.*
Wikipedia, "Container (data structure)", http://en.wikipedia.org/wiki/Container_(data_structure)#Graphic_Containers.*
Wikipedia, "Windows Shell", http://en.wikipedia.org/wiki/Windows_shell.*
Microsoft Windows XP Professional version 2002, Oct. 25, 2001 (7 pages).
Chadlezek et al., "Generic Keyboard Navigation," U.S. Appl. No. 10/676,802, filed Sep. 30, 2003.

* cited by examiner

KEYBOARD NAVIGATION IN HIERARCHICAL USER INTERFACES

BACKGROUND

The present invention relates to data processing by digital computer, and more particularly, to navigating user interface (UI) elements of a software application using a keyboard.

Users interact with a software application using UI elements presented by the software application. Some UI elements have fields that can be used by the user to provide input using a keyboard. Some UI elements have associated commands for the software application that are executed when the user selects the UI element. Buttons and menus are examples of UI elements that have associated commands.

Many users of a software application require the ability to interact with the UI elements presented by the software application efficiently using a keyboard. Software applications provide navigation keys and activation keys to allow users to interact with the UI elements using the keyboard. The user presses the navigation keys to shift input focus between or among the UI elements of the software application. Shifting input focus to a UI element that has associated commands does not result in the execution of the associated commands. Typically the user must take some further action, e.g., press the ENTER key, to execute the associated commands for a UI element after the UI element has input focus. Activation keys can be associated with a UI element that has associated commands. Pressing the activation key for a UI element results in the execution of the associated commands.

Tab chain navigation is one example of using navigation keys to navigate the UI elements of a software application. In tab chain navigation, UI elements for the software application are in effect grouped into a list, which can be circular. The elements in any particular list are typically those available on one display screen. Pressing the TAB key changes the input focus from one UI element to the next UI element in the list. In some environments, pressing shift-TAB changes the input focus to a previous UI element in the list.

Tab chain navigation can be slow when navigating from a currently selected UI element to a desired UI element. The user must press the TAB key to navigate through all the intermediate UI elements between the UI element currently having input focus and the desired UI element in order to access the desired UI element.

Hot keys are one example of activation keys. A hot key can be a single keyboard key, or a combination of keyboard keys, that is associated with a UI element for the software application. Pressing the hot key results in the execution of the command associated with the hot key. An example of the use of a hot key is the use of the key combination CTRL-P to execute the print command in a software application.

Hot keys can require a significant effort to maintain when applications are localized. For example, the hot key CTRL-P may correspond to the English word "print" but it does not correspond to the German word "drucken" or the French word "imprimer." It is generally desired that all UI elements appearing on a screen be assigned unique hot keys. In order to do so and localize the application, a set of localized hot keys must be generated for each screen of the application. In addition, it may be desired that some hot keys be unique over all screens of the application.

SUMMARY OF THE INVENTION

In general, in one aspect, the invention provides methods and apparatus including computer program products, implementing techniques for providing navigation to user interface elements of a software application using a keyboard. The techniques include detecting a navigation key press of a navigation key having a group identifier, identifying a selected group of user interface elements associated with the group identifier, and shifting input focus to a new user interface element in the selected group based on the navigation key.

Advantageous implementations of the invention include one or more of the following features. The navigation key can be a forward navigation key or a backward navigation key. The user interface elements can have associated text labels, where the user interface elements associated with the group identifier are user interface elements having an associated text label with the first character that matches the group identifier. A character matches the group identifier if both are the same character regardless of the case or if both are the same character in the same case. The user interface element can have associated text labels and the user interface elements can be grouped into groups based on the first character of the associated text label. The grouping can be performed during a run time of the computer program application. Grouping the user interface elements into groups based on the first character of the associated text label can include grouping only the user interface elements in a current screen of the application. If the navigation key is a forward navigation key, shifting input focus to a new user interface element can include shifting input focus to a next user interface element in the selected group. If the navigation key is a backward navigation key, shifting input focus to a new user interface element can include shifting input focus to a previous user interface element in the selected group. Shifting input focus to a next user interface element can include specifying an order for the user interface elements and shifting input focus to the next user interface elements in the order, where the next user interface element is a member of the group of user interface elements. Shifting input focus to a previous user interface element can include creating an ordered list of the user interface elements, and shifting input focus to the previous user interface elements in the ordered list, where the previous user interface element is a member of the group of user interface elements. The forward navigation key can be a combination of one or more forward modifier keys and the group identifier, and the backward navigation key can be a combination of one or more backward modifier keys and a group identifier.

In another aspect, the invention provides methods and apparatus implementing techniques for a software application having user interface elements, including creating an ordered list of the user interface elements, detecting a sequence of one or more navigation key presses of navigation keys, generating a navigation string using the group identifiers for the navigation keys, and shifting input focus to a user interface element identified by the navigation string. Each navigation key has a group identifier, and each navigation key can be a forward navigation key or a backward navigation key.

Advantageous implementations of the invention include one or more of the following features. Detecting a sequence of one or more navigation key presses can include detecting a sequence of forward navigation key presses, the sequence having a first navigation key press and a last navigation key press. The navigation string is initialized when the first navigation key press is detected and a time out interval is started with each forward navigation key press. The last navigation key press is determined to be the key press after which no forward navigation key presses are detected within the time out interval. Detecting the sequence of one or more navigation key presses can include detecting a sequence of backward navigation key presses, the sequence having a first navigation key press and a last navigation key press. The navigation string is initialized when the first navigation key press is detected. A time out interval is started with each backward navigation key press. The last navigation key press is determined to be the key press after which no backward navigation key presses are detected within the time out interval. Generating the navigation string can include extracting the group identifier from each navigation key, and generating a navigation string using the group identifiers. Each navigation key has an ordinal position in the sequence of navigation key presses. Each group identifier has the same ordinal position in the navigation string as the ordinal position of the associated navigation key in the sequence of navigation key presses. If the navigation key is a forward navigation key, shifting input focus to a user interface element can include creating an ordered list of the user interface elements and shifting input focus to the next user interface element in the ordered list having a text label starting with the same character as the characters in the navigation string. If the navigation key is a backward navigation key, shifting input focus to a user interface element can include shifting input focus to the previous user interface element in the ordered list having a text label starting with the same characters as the characters in the navigation string.

In another aspect, the invention provides methods and apparatus implementing techniques for providing activation keys for user interface elements of a computer program application. The techniques include detecting a sequence of characters by detecting an ensemble of sequential activation key presses, where each activation key has a character, identifying a matching activation user interface element having a label matching the sequence of characters, and performing an action associated with the matching activation user interface element.

Advantageous implementations of the invention include one or more of the following features. Detecting an ensemble can include detecting a sequence of one or more characters that uniquely identifies an activation user interface element. The sequence of one or more characters can be a sequence of identical group identifiers. Detecting an ensemble can include detecting one or more sequential activation key presses entered by a user within a time threshold. Detecting an ensemble can include detecting the pressing and releasing of an activation modifier key delimiting the activation key presses in the ensemble.

In another aspect, the invention provides methods and apparatus implementing techniques for navigating user interface elements of a computer program application. The user interface elements have a hierarchical arrangement. The techniques include grouping the user interface elements into groups based on the hierarchical arrangement, and detecting a navigation key press of a sibling navigation key or a parent navigation key. If the navigation key is a sibling navigation key, input focus shifts to a next sibling group in the hierarchy. If the navigation key is parent navigation key input focus shifts to a parent group in the hierarchy.

In another aspect, the invention provides methods and apparatus implementing techniques for navigating editable cells of a table including detecting a navigation key press of a forward navigation key or a backward navigation key. If the navigation key is a forward navigation key, input focus shifts to a next editable cell of a table. If the navigation key is a backward navigation key, input focus shifts to a previous editable cell of the table.

Advantageous implementations of the invention include one or more of the following features. If a switch-cell-mode key is pressed while an editable cell currently having input focus is not in an edit mode, the editable cell can be switched to the edit mode, where user input can modify content of the editable cell in the edit mode. If a switch-cell-mode key is pressed while the editable cell currently having input focus is in the edit mode, the editable cell is switched to a focus mode, where the content of the editable cell cannot be modified in the focus mode.

The invention can be implemented to realize one or more of the following advantages. Several navigation keys can be provided for a software application based on the text labels of the UI elements presented by the software application. A navigation key assignment is easy to localize and maintain because the navigation key assignment can be derived automatically from a graphical user interface (GUI) for the application. Users can easily remember the navigation keys because they are derived from one or more characters of the associated text label. The navigation keys can be provided easily even in an environment where the UI elements presented by the application change as the application is updated or customized. The navigation keys derived from the UI elements presented by the application are easy to maintain and support.

The details of one or more implementations of the invention are set forth in the accompanying drawings and the description below. Further features, aspects, and advantages of the invention will become apparent from the description, the drawings, and the claims.

DETAILED DESCRIPTION

Figure 1:
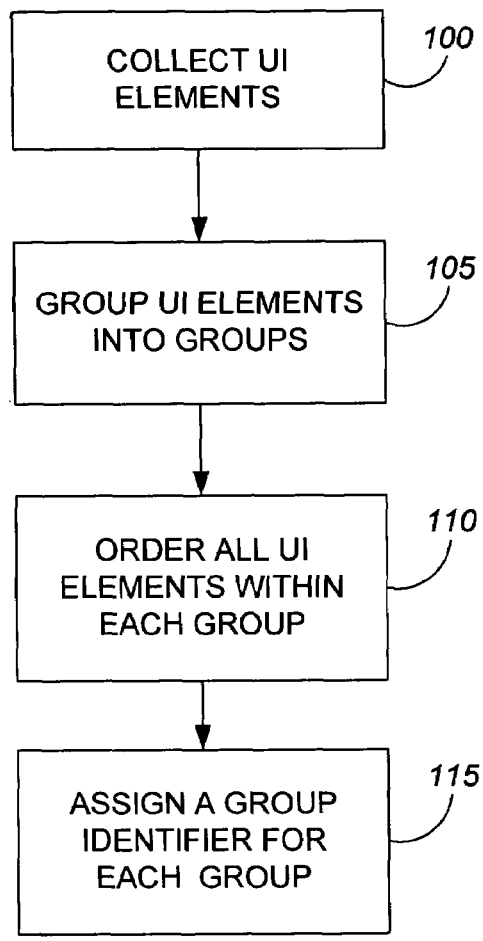
FIG. 1 is a flow diagram illustrating one programmed implementation of a grouping of UI elements presented by an application.

Navigation keys are provided by grouping the UI elements of a computer program application, and assigning a navigation key for each group of UI elements. FIG. 1 is a flow diagram illustrating one programmed implementation of the grouping of UI elements presented by an application. The UI elements presented by the software application that would be suitable destinations for navigation—e.g., all UI elements that can receive user input—are collected along with the text label for each UI element (step 100). The UI elements or pointers to them are stored in a list or other data structure. The application will generally present different sets of UI elements on the screen for different parts of the application. In one implementation, only the UI elements currently presented on the screen are included. The UI elements are grouped into UI element groups (step 105). Each UI element group contains all the UI elements for which the text label starts with the same alphanumeric character. The UI elements within a UI element group are ordered (step 110). In one implementation, the UI elements are ordered, within the groups and in the aggregate, based on the order in which the UI elements are presented on the screen. In another implementation, the UI elements are ordered based on the associated text label. Each UI element group is assigned a group identifier (step 115) that uniquely identifies the UI element group among all the other UI element groups, e.g., the group identifier for a group can be the first alphanumeric character of the text label for the UI elements within the UI element group.

The group identifier of a UI element group is used to define the navigation keys for the group. A forward modifier key is defined. Optionally, a backward modifier key is also defined. These keys can be defined for the application or for a family of applications. In one implementation, the forward modifier key and the backward modifier key are selected by the developer of the application when the application is designed. In other implementations, the forward modifier key and the backward modifier key are selected at run time based on user input or are system defined. The forward modifier key and the backward modifier key can each be a combination of more than one keyboard key. If it is a combination, the combined keys (along with the group identifier key) will generally be pressed simultaneously; however, if accessibility options are in effect on a user's computer, they may be pressed one after the other. The forward modifier key is combined with the group identifier to obtain the forward navigation key. The backward modifier key is combined with the group identifier to obtain the backward navigation key. In one implementation, the forward modifier key is the ALT key and the backward modifier key is a combination of the SHIFT key and the ALT key, denoted SHIFT+ALT.

Figure 2:
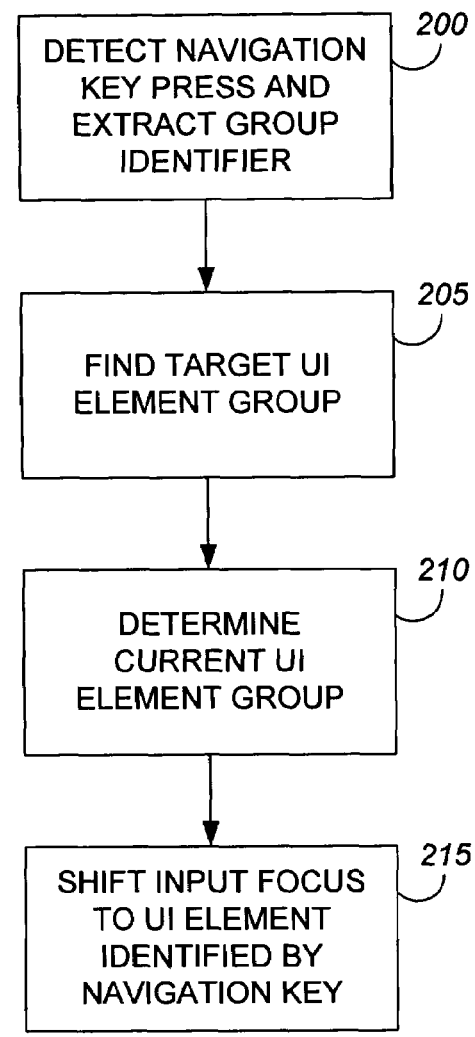
FIG. 2 illustrates one implementation of a method using forward navigation key presses and backward navigation key presses to shift input focus.

FIG. 2 illustrates one implementation of a method using forward navigation key presses and backward navigation key presses to shift input focus. When a navigation key press is detected, the group identifier is extracted from the navigation key (step 200). The group identifier is used to find the target UI element group associated with the navigation key (step 205). If a UI element currently has input focus, the associated current UI element group is determined (step 210). Input focus is changed to the UI element identified by the navigation key, based on the current UI element group and the target UI element group (step 215).

Figure 3A:
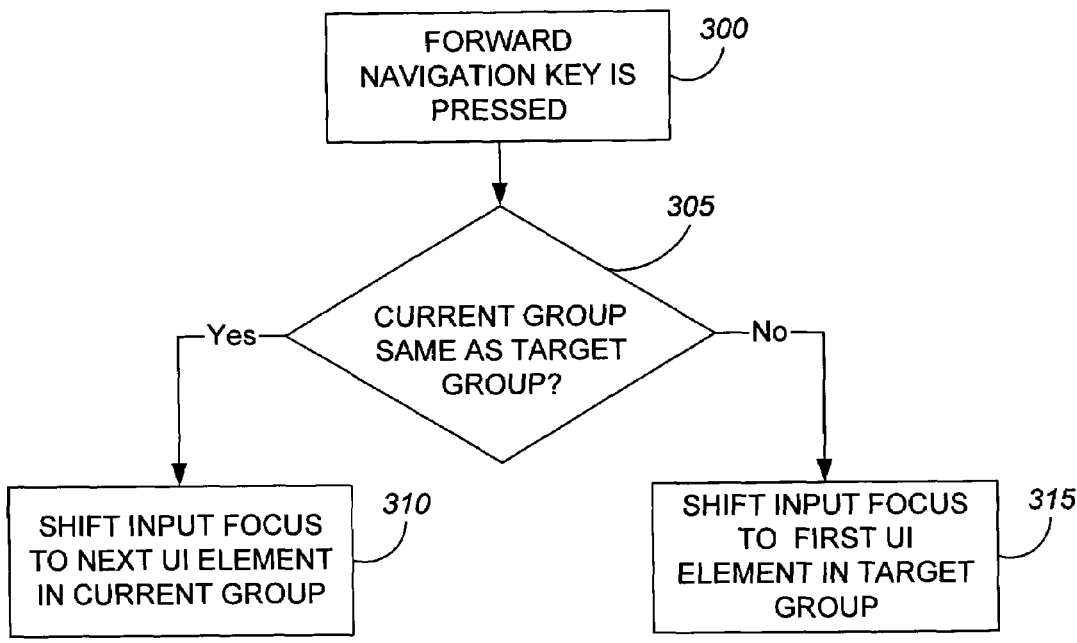
FIG. 3A is a flow diagram illustrating a method for shifting input focus for a forward navigation key press.

FIG. 3A is a flow diagram illustrating shifting input focus for a forward navigation key press. When a forward navigation key is pressed (step 300), the current group and target group of UI elements is determined. This can be done as illustrated in FIG. 2. If the current group is the same as the target group ("yes" branch from decision step 305), input focus is shifted to the next UI element in the current group (step 310). If the current group is not the same as the target group ("no" branch from decision step 305), input focus is shifted to the first UI element in the target group (step 315). If there is no current UI element group, e.g., because the user had not selected an UI element before the navigation key press, the target UI element group is deemed to be different from the current UI element group (step 305) and input focus is shifted to the first UI element in the target group (step 315).

Figure 3B:
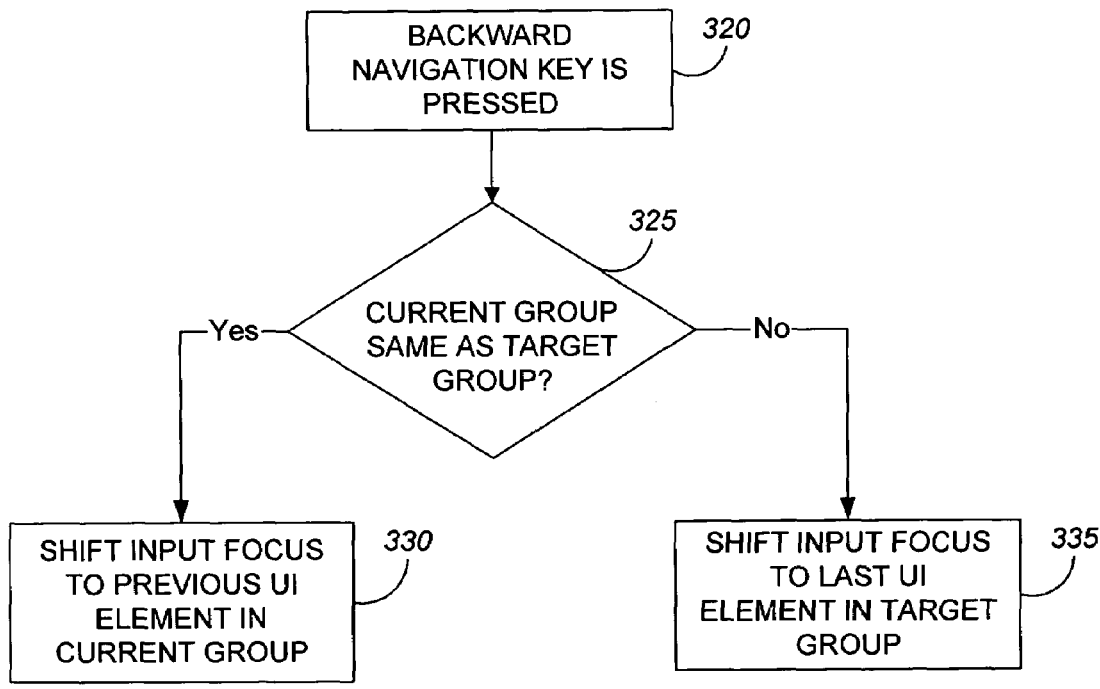
FIG. 3B is a flow diagram illustrating a method for shifting input focus for a backward navigation key press.

FIG. 3B is a flow diagram illustrating shifting input focus for a backward navigation key press. When a backward navigation key is pressed (step 320), the current group and target group of UI elements is determined. This can be done as illustrated in FIG. 2. If the current group is the same as the target group ("yes" branch from decision step 325), input focus is shifted to the previous UI element in the current group (step 330). If the current group is not the same as the target group ("no" branch from decision step 325), input focus is shifted to the last UI element in the target group (step 335). If there is no current UI element group, e.g., because the user had not selected an UI element before the navigation key press, the target UI element group is deemed to be different from the current UI element group (step 325) and input focus is shifted to the last UI element in the target group (step 335).

Figure 4:
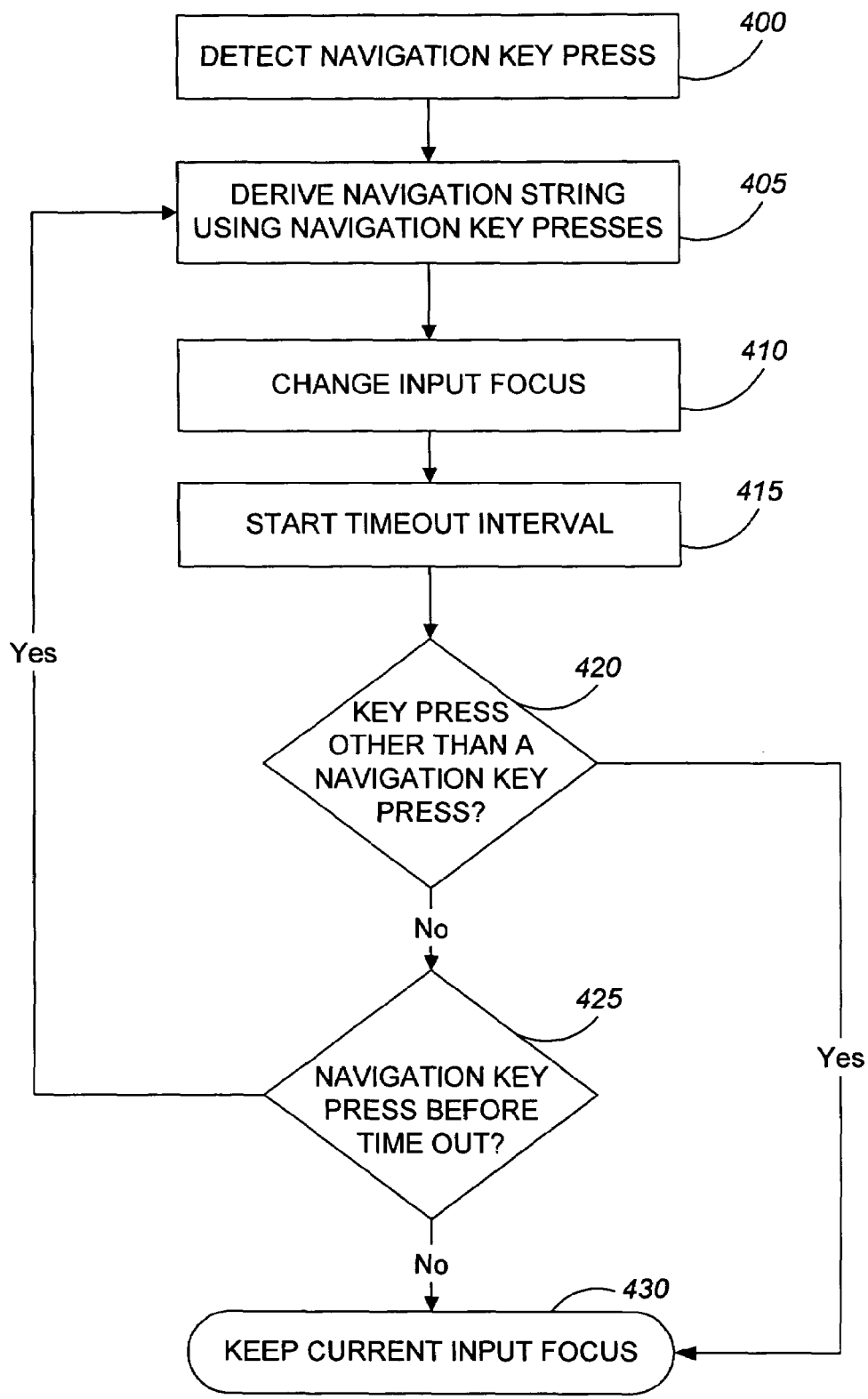
FIG. 4 is a flow diagram illustrating an alternative implementation of the method for shifting input focus based on a sequence of navigation key presses when the navigation keys are pressed quickly.

FIG. 4 is a flow diagram illustrating an alternative implementation of the method for shifting input focus based on a sequence of navigation key presses when the navigation keys are pressed quickly. If the time interval between navigation key presses is less than a predefined time out interval, the sequence of group identifiers associated with the sequence of navigation keys is used to create a navigation string. The method starts with detecting a navigation key press (step 400) and using the group identifier associated with the navigation key to derive a navigation string (step 405). Input focus is changed to a UI element whose text label starts with the characters in the navigation string (step 410) and a time out interval is started (step 415). If a key press other than a navigation key press is detected ("yes" branch from decision step 420) or a navigation key press is not detected within the time out interval ("no" branch from decision step 425), the sequence is terminated and the current navigation focus is maintained (step 430). If a navigation key press is detected within the time out interval ("yes" branch from decision step 425), control is transferred to step 405. The navigation string is incrementally updated as additional navigation presses are detected that satisfies the time out criterion (step 405) and input focus is changed incrementally based on the current navigation string (step 410).

The navigation string in step 405 is derived using the group identifiers associated with navigation keys that have the same direction, i.e., forward or backward. The navigation string is re-initialized by a navigation key press having a direction that is different from the navigation key presses used to derive the navigation string. For example, a backward navigation key press following a sequence of forward navigation key presses will initialize the navigation string derived using the forward navigation key presses. A new navigation string will be derived using only the group identifier associated with the backward navigation key press.

In one exemplary implementation of the method of FIG. 4, the next UI element to receive input focus is identified by searching an ordered list of UI elements starting from the UI element that currently has input focus. If the navigation string has been generated by forward navigation key presses, the list is searched in a forward direction. If the navigation string has been generated by backward navigation key presses the list is searched in a backward direction. In one implementation, the list of UI elements is created by ordering the UI elements using the associated text labels. In another implementation, the list of UI elements is created by ordering the UI elements based on the order in which they appear on the computer display.

Figure 5:
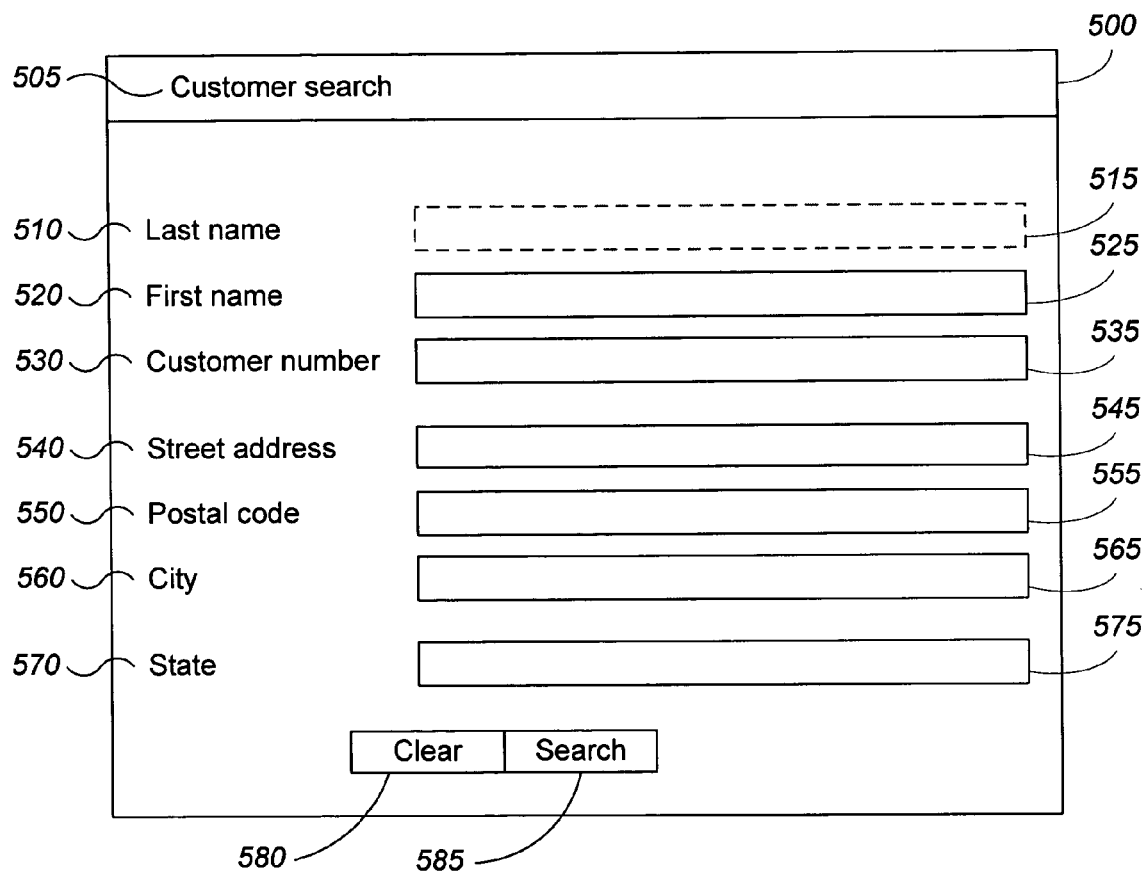
FIG. 5 illustrates an example using the disclosed method for navigating UI elements.

FIG. 5 illustrates an example using the disclosed method for navigating UI elements. The example shows a group of UI elements that belong to a group 500 with title "Customer search" 505. The UI elements include elements that accept keyboard input, e.g., "Last name" 510, "First name" 520, "Customer number" 530, "Street address" 540, "Postal code" 550, "City" 560, and "State" 570. The UI elements also include two buttons identified by their associated labels, "Clear" 580 and "Search" 585. The UI element currently having input focus, "Last name" 510, is indicated by highlighting the associated keyboard input area using a dotted line. The software application defines the ALT key as the forward modifier key and the ALT+SHIFT key as the backward modifier key. If the embodiment shown in FIG. 2 is implemented and the user presses ALT+S multiple times, the input focus changes to "Street address" 540, then "State" 570 and "Search" 585. If the alternative embodiment shown in FIG. 4 is implemented and input focus is currently in "Postal code" 550, as the user presses ALT+S, ALT+T, and ALT+R without expiration of the time out interval, the sequence of UI elements having input focus changes with each key press from "Postal code" 550 to "State" 560, "State" 560, and "Street address" 540.

In one implementation, hierarchical tab chains are created that contain all the UI elements currently displayed by an application. The UI elements are hierarchically arranged according to the arrangement of the containers that contain the elements. Each container can include other containers. Each container is represented as a node in the tab chain hierarchy. A separate tab chain is created for each container, where each separate tab chain contains all the UI elements in the container. The user interface displayed by the application can include one or more views, where each view includes at least one UI element. Creating a new view creates a view container that contains all the UI elements for the new view. The hierarchical tab chain for the new view is added to the existing tab chain by adding a new node for the new view container in the existing hierarchical tab chain.

In one example, in a situation where the UI elements presented by the software application have a hierarchical arrangement, the UI elements are placed in an arrangement of lists or other data structures representing the same hierarchical arrangement. Thus, the UI elements can be presented by the software application using a number of windows such that there is a hierarchical relationship between the windows. The UI elements within each list are grouped and ordered as described in reference to FIG. 1. In this implementation, the navigation key presses are used to change input focus between the UI elements in the currently selected list of UI elements. Additional key presses, different from the forward and backward navigation keys, are defined to navigate up and down the hierarchical lists of UI elements in order to change the currently selected list of UI elements. For example, a sibling navigation key is defined to navigate to the next sibling UI element list in the hierarchy, and a parent navigation key is defined to navigate to the parent UI element group in the hierarchy. In one implementation, the TAB key is used to change input focus between the UI elements in the currently selected list of UI elements, the TAB+X key is used to shift input focus to the next sibling UI element list in the hierarchical arrangement, and the TAB+Y key is used to shift input focus to the parent UI element list in the hierarchical arrangement.

The foregoing techniques can also be used to define activation keys associated with the UI elements presented by a software application. For this purpose, an activation modifier key is defined, either a sole key or both forward and backward keys, as described above in reference to the navigation modifier keys. The activation keys, like the navigation keys, combine a modifier and a group identifier.

Because selection of an activation key by a user causes an action to occur, the user interface defines a protocol by which the user can indicate that a set of multiple key presses of activation keys should be taken to be a single ensemble to request that a single associated action be performed.

In one implementation, the technique of FIG. 4 is used to build a string of group identifiers from one or more action key presses. When the string unambiguously identifies a UI element, the action associated with the element is performed. For example, the string uniquely identifies a UI element if there is only one UI element that has an associated label starting with the sequence of characters in the string.

In another implementation, the technique of FIG. 2 is used to select successive UI elements. The user makes one or more activation key presses to select a first or subsequent UI element in a group. In this implementation, a time-out threshold is used to determine when the last of a sequence of key presses has been made. Advantageously, in this implementation, the first key press is always associated with a first action in a group, regardless of where focus was when the activation key was pressed, so that user interaction with the keyboard can become automatic. Optionally, an order of action UI elements can be defined that is independent of alphabetical order within a group, so that with new releases of a software application, new elements are added at the end of the order and users need not relearn keystroke habits to accommodate elements inserted into a familiar order.

In another implementation, the pressing and releasing of an activation modifier key is used to delimit multiple group identifier key presses and define a single activation key press. In this implementation the user can press a sequence of activation keys without releasing the modifier key to navigate the UI controls. The UI control currently having input focus when the modifier key is released is executed. In another implementation based on the same principle, a sequence of navigation keys pressed by a user without releasing the modifier key is used to derive a string that determines the action to be performed.

An application or family of applications can be implemented with navigation keys or activation keys or both. If both are implemented, the UI elements collected for activation key purpose (see step 100 of FIG. 1) would advantageously include only action UI elements, i.e., elements having actions associated with them.

The foregoing techniques can be implemented in a situation where the UI controls are presented as a table having editable cells and non-editable cells. The table cells have a focus mode such that the user can change input focus to a cell that is in the focus mode, but the contents of a table cell in the focus mode cannot be modified. The editable cells of the table have a field that can accept user input, when the editable cells are in an edit mode. The user modifies the content of an editable cell by using navigation keys to change input focus to the editable cell, and switching the editable cell to the edit mode using a switch-cell-mode key. Pressing the switch-cell-mode key while the editable cell is in the edit mode, switches the editable cell to the focus mode. In one implementation, TAB key presses are used to change input focus to the next editable cell of the table, SHIFT+TAB key presses are used to change input focus to the previous editable cell in the table, and pressing the ENTER key switches the editable cell currently having input focus to the edit mode. In another implementation, the editable cell currently having input focus is automatically switched to the editable mode when the user starts typing. In one implementation, if the input focus is on the last cell of the table, pressing the TAB key results in adding a new row. In an alternative implementation, pressing the TAB key while the input focus is on the last cell of the table results in shifting input focus to the next UI element displayed on the screen. In one implementation, if the input focus is on the first row of the table, pressing the SHIFT+TAB key to change input focus to the previous editable cell in the table changes input focus to the last column header.

Advantageously, the UI controls can be divided into groups during run time. Alternatively, where all the necessary information is available at compile or build time, the processing could be done then instead. In one implementation, tab chain navigation can be combined with the disclosed method by using the TAB key, or any other predefined key, for tab chain navigation within the group associated with the UI control that currently has keyboard focus.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device (that is, a computer-readable storage medium) for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The invention has been described in terms of particular embodiments. Other embodiments are within the scope of the following claims. For example, the steps of the invention can be performed in a different order and still achieve desirable results.

What is claimed is:

1. A method performed by a computer for navigating user interface elements, the method comprising:
   receiving, by a processor associated with the computer, a display of a graphical user interface of a computer program application, the graphical user interface including user interface elements comprising a hierarchical arrangement of parent graphical user interface elements and sibling graphical user interface elements;
   searching the display, by the processor, to identify the parent graphical user interface elements and the sibling graphical user interface elements;
   collecting from the display, by the processor, text labels for the identified parent and sibling graphical user interface elements;
   grouping, by the processor, the user interface elements alphabetically into parent groups and sibling groups based on alphanumeric characters contained in the collected text labels for the user interface elements;
   detecting, by the processor, a user navigation input comprising a sibling navigation input and a user navigation input comprising a parent navigation input, the sibling navigation input comprising a sibling navigation key press plus a key press of a first alphanumeric character, the first alphanumeric character identifying a sibling group of user interface elements, and the parent navigation input comprising a parent navigation key press plus a key press of a second alphanumeric character, the second alphanumeric character identifying a parent group of user interface elements;
   when the detected navigation input is the sibling navigation input:
      identifying, by the processor, a sibling group of user interface elements having a text label alphabetically corresponding to the key press of the first alphanumeric character; and
      shifting, by the processor, input focus to the identified sibling group; and
   when the detected navigation input is the parent navigation input:
      identifying, by the processor, a parent group of user interface having a text label alphabetically corresponding to the key press of the second alphanumeric character; and
      shifting, by the processor, input focus to the identified parent group.

2. The method of claim 1, further comprising:
   creating, by the processor, one or more hierarchical tab chains containing all user interface elements currently displayed by the application, the user interface elements in the one or more hierarchical tab chains being ordered alphabetically according to their associated text labels,
   wherein a node in a tab chain hierarchy is a container comprising one or more user interface elements and the container comprises a tab chain that contains all the user interface elements in the container.

3. The method of claim 2, further comprising:
   creating, by the processor, a new view container displaying a hierarchical tab chain that contains all the user interface elements for a new view of user interface elements, the user interface elements in the new view container being displayed in alphabetic order based on their associated text labels;
   wherein the hierarchical tab chain for the new view is added to an existing hierarchical tab chain by adding a new node for the new view container in the existing hierarchical tab chain.

4. A computer-readable storage medium storing a computer program that, when executed by a computer, causes the computer to:
   receive a display of a graphical user interface of a computer program application, the graphical user interface including graphical user interface elements comprising a hierarchical arrangement of parent graphical user interface elements and sibling graphical user interface elements;
   search the display to identify the parent graphical user interface elements and the sibling graphical user interface elements;

collect from the display text labels for the identified parent and sibling graphical user interface elements;

group the user interface elements of a user interface alphabetically into parent groups and sibling groups based on alphanumeric characters contained in the collected text labels for the user interface elements;

detect a user navigation input comprising a sibling navigation input and a user navigation input comprising a parent navigation input, the sibling navigation input comprising a sibling navigation key press plus a key press of a first alphanumeric character, the first alphanumeric character identifying a sibling group of user interface elements, and the parent navigation input comprising a parent navigation key press plus a key press of a second alphanumeric character, the second alphanumeric character identifying a parent group of user interface elements;

when the detected navigation input is the sibling navigation input:
    identifying a sibling group of user interface elements having a text label alphabetically corresponding to the key press of the first alphanumeric character; and
    shifting input focus to the identified sibling group; and when the detected navigation input is the parent navigation input:
    identifying a parent group of user interface having a text label alphabetically corresponding to the key press of the second alphanumeric character; and
    shifting input focus to the identified parent group.

5. The computer-readable storage medium of claim 4, the executed program further causing the computer to:

create one or more hierarchical tab chains containing all user interface elements currently displayed by the application, the user interface elements in the one or more hierarchical tab chains being ordered alphabetically according to their associated text labels, wherein a node in a tab chain hierarchy is a container comprising one or more user interface elements and the container comprises a tab chain that contains all the user interface elements in the container.

6. The computer-readable storage medium of claim 5, the executed program further causing the computer to:

create a new view container displaying a hierarchical tab chain that contains all the user interface elements for the new view, the user interface elements in the new view container being displayed in alphabetic order according to their associated text labels;

wherein the hierarchical tab chain for the new view is added to an existing tab chain by adding a new node for the new view container in the existing hierarchical tab chain.

7. A system comprising:

means for receiving a display of a graphical user interface of a computer program application, the graphical user interface including user interface elements comprising a hierarchical arrangement of parent user interface elements and sibling user interface elements;

means for searching the display to identify the parent user interface elements and the sibling user interface elements;

means for collecting from the display text labels for the identified parent and sibling user interface elements;

means for grouping the user interface elements alphabetically into parent groups and sibling groups based on alphanumeric characters contained in the collected text labels for the user interface elements;

means for detecting a user navigation input comprising a sibling navigation input and a user navigation input comprising a parent navigation input, the sibling navigation input comprising a sibling navigation key press plus a key press of a first alphanumeric character, the first alphanumeric character identifying a sibling group of user interface elements, and the parent navigation input comprising a parent navigation key press plus a key press of a second alphanumeric character, the second alphanumeric character identifying a parent group of user interface elements;

means for, when the detected navigation input is the sibling navigation input:
    identifying a sibling group of user interface elements having a text label alphabetically corresponding to the key press of the first alphanumeric character; and
    shifting input focus to the identified sibling group; and means for, when if the detected navigation input is the parent navigation input:
    identifying a parent group of user interface elements having a text label alphabetically corresponding to the key press of the second alphanumeric character; and
shifting input focus to the identified parent group.

8. The system of claim 7, further comprising:

means for creating one or more hierarchical tab chains containing all user interface elements currently displayed by the application, the user interface elements in the one or more hierarchical tab chains being ordered alphabetically according to their associated text labels, wherein a node in a tab chain hierarchy is a container comprising one or more user interface elements and the container comprises a tab chain that contains all the user interface elements in the container.

9. The system of claim 8, further comprising:

creating a new view container displaying a hierarchical tab chain containing all the user interface elements for the new view, the user interface elements in the new view container being displayed in alphabetic order based on their associated text labels;

wherein the hierarchical tab chain for the new view is added to an existing hierarchical tab chain by adding a new node for the new view container in the existing hierarchical tab chain.

\* \* \* \* \*